(12) United States Patent
Meyer et al.

(10) Patent No.: US 11,417,240 B2
(45) Date of Patent: Aug. 16, 2022

(54) TRAINING DEVICE FOR SIMULATING A VASCULAR BED THROUGH WHICH FLOW PASSES, AND ASSOCIATED METHOD

(71) Applicant: Bernhard Meyer, Hannover (DE)

(72) Inventors: Bernhard Meyer, Hannover (DE); Thomas Werncke, Wandlitz (DE)

(73) Assignee: Bernhard Meyer, Hannover (DE)

( * ) Notice: Subject to any disclaimer, the term of this patent is extended or adjusted under 35 U.S.C. 154(b) by 0 days.

(21) Appl. No.: 16/888,098

(22) Filed: May 29, 2020

(65) Prior Publication Data

US 2020/0402424 A1 Dec. 24, 2020

(51) Int. Cl.
*G09B 23/28* (2006.01)
*G09B 23/30* (2006.01)

(52) U.S. Cl.
CPC ......... *G09B 23/285* (2013.01); *G09B 23/286* (2013.01); *G09B 23/303* (2013.01)

(58) Field of Classification Search
CPC ... G09B 23/303; G09B 23/286; G09B 23/285
See application file for complete search history.

(56) References Cited

U.S. PATENT DOCUMENTS

| | | | | |
|---|---|---|---|---|
| 8,386,017 | B2* | 2/2013 | Hengerer | G01R 33/5635 600/419 |
| 2005/0186361 | A1* | 8/2005 | Fukuda | G09B 23/30 428/15 |
| 2008/0020362 | A1* | 1/2008 | Cotin | G09B 23/285 434/267 |
| 2011/0144658 | A1* | 6/2011 | Wenderow | G16H 50/50 606/130 |
| 2013/0288218 | A1* | 10/2013 | Mallin | G09B 23/303 434/268 |
| 2014/0087344 | A1* | 3/2014 | Mavroudis | G09B 23/306 434/272 |
| 2016/0148541 | A1* | 5/2016 | Ristolainen | G09B 23/285 434/268 |
| 2017/0103682 | A1* | 4/2017 | Okayama | G06T 7/0012 |
| 2018/0018904 | A1* | 1/2018 | Okayama | G09B 23/286 |
| 2019/0021865 | A1* | 1/2019 | Vogtmeier | A61B 6/5205 |
| 2021/0272480 | A1* | 9/2021 | Yoneyama | G09B 23/303 |
| 2021/0350723 | A1* | 11/2021 | Pirlot | G09B 23/303 |

FOREIGN PATENT DOCUMENTS

| | | |
|---|---|---|
| DE | 10 2016 108 152 A1 | 2/2017 |
| DE | 10 2016 217 316 B3 | 2/2018 |
| EP | 2 772 897 A1 | 9/2014 |

OTHER PUBLICATIONS

German Office Action in application No. 10 2019 116 827.9, dated Dec. 20, 2019 (10 pages).
European Patent Office Action in application No. 20176503.9-1222, dated Nov. 5, 2020 (16 pages).

* cited by examiner

*Primary Examiner* — Malina D. Blaise
(74) *Attorney, Agent, or Firm* — Shlesinger, Arkwright & Garvey LLP (57) ABSTRACT

A training device and an associated method for simulating a static, dynamic, statically contrasted, and/or dynamically contrasted fluid motion within a three-dimensional (3D) vascular bed.

6 Claims, 6 Drawing Sheets

TRAINING DEVICE FOR SIMULATING A VASCULAR BED THROUGH WHICH FLOW PASSES, AND ASSOCIATED METHOD

CROSS-REFERENCE TO RELATED APPLICATIONS

This application claims the priority of German application no. DE 2019 116 827.9, filed Jun. 21, 2019, and which is incorporated herein by reference.

BRIEF DESCRIPTION OF THE INVENTION

The present invention relates to a training device for simulating a vascular bed with static and/or dynamic fluid motion, preferably for simulating a contrasted static and/or contrasted dynamic fluid motion within the vascular bed. Prior to an intervention or the application of a treatment to a living organism, it is advantageous to carry out certain sequences of interventions and/or treatments on a training apparatus so that they may be learned. Simulations may be used in medical training for learning necessary skills and/or improving individual performance. In addition, by use of controlled settings and possibly repetitions, the stress level of the trainees is reduced, the individual skills are enhanced, and/or confidence is acquired. Besides the above-mentioned educational advantages, it is also possible to solve practical problems via simulations.

OBJECTS AND SUMMARY OF THE INVENTION

Complex systems having virtual simulation or complicated device design, for example, are known from the prior art which entail great expense and production effort. In addition, the systems from the prior art are usually very large, so that mobile use of the training devices at different locations involves a significant amount of effort.

An object of the present invention, therefore, is to provide an easily transportable and easily manufacturable training device which the mobile simulation of a vascular bed with static and/or dynamic fluid motion, preferably for simulating a contrasted static and/or contrasted dynamic fluid motion within the three-dimensional vascular bed. A further aim is for the training device to include the option for allowing simulation of various radiological imaging techniques (RITs) and/or simulation of image fusion thereof by application of registration techniques on the angiography apparatus.

The training device is to be used for the mobile simulation of a vascular bed with static and/or dynamic fluid motion, preferably for simulating a contrasted static and/or contrasted dynamic fluid motion within the vascular bed, in order to apply various radiological imaging techniques on the training device.

The static and/or dynamic contrasting of the fluid within the vascular bed allows three-dimensional representation of the training device and its components by means of magnetic resonance tomography (MRT), computed tomography (CT), C-arm computed tomography (CACT), and rotational angiography (RAX), and two-dimensional representation by means of digital radiography (DX) and transillumination (TI).

Dynamic vascular contrasting allows in particular the testing of typical transillumination-assisted work techniques such as transillumination (TI) and digital subtraction angiography (DSA).

A further aim is for the training device to be used for development, testing, and didactic communication of image fusion techniques on the angiography apparatus by the use of registration techniques.

The present invention therefore relates to a training device for simulating a static and/or dynamic fluid motion within the vascular bed, encompassing a simulation of a vascular bed that is situated within a body and is connected via at least two openings for connection or for filling, wherein the device has a flat support surface, in the area of which at least one object having a different radiodensity in comparison to the body and/or the vascular bed is situated within the device. In one preferred embodiment, in addition to the simulation of a vascular bed with static and/or dynamic fluid motion, the training device is also used for simulating a contrasted static and/or contrasted dynamic fluid motion within the vascular bed. The object preferably has a different radiodensity, preferably a higher radiodensity, in comparison to the body and/or the vascular bed.

In one embodiment, the training device has at least two ports at opposite sides of the body, on the cover plate and the base plate.

In one embodiment, the body of the training device is made of a material for which the imaging is homogeneously hypodense in computed tomography (CT) and is hypointense in magnetic resonance tomography, wherein in computed tomography (CT) the material preferably has a homogeneous fat- to soft tissue-like density of −30 to 100 Hounsfield units (HU), and in magnetic resonance tomography has a hypointense signal characteristic in comparison to fat. The material is particularly preferably a transparent or colored synthetic resin.

In one embodiment, the at least one object, having a different radiodensity in comparison to the body and/or the vascular bed and situated within the training device, has the shape of stylized vertebrae with transverse processes. Furthermore, in one preferred embodiment the at least one object has a radiodensity of 400-1600 Hounsfield units in computed tomography (CT). In addition, the at least one object particularly preferably has a different signal intensity in MRT (MRSI) in comparison to the body and/or the vascular bed. In another embodiment, the object is connected to two other structurally identical objects.

In one embodiment, the vascular bed has a three-dimensional design and also includes a central aortic equivalent, at least one lateral branch, and at least one discharge channel.

In one preferred embodiment the aortic equivalent is made up of four sections:
  i) a proximal cylindrical section ($HSA_{prox}$) that directly adjoins the cover plate and preferably has a length of 2 cm;
  ii) a central section ($HSA_{central}$) that adjoins the $HSA_{prox}$ and preferably has a length of 10 cm;
  iii) a section $HSA_{red}$, following the $HSA_{central}$, that results in a caliber reduction and preferably has a length of 1.5 cm; and
  iv) a distal section $HSA_{dist}$ that adjoins the port ZO in the base plate and preferably has a length of 1 cm.

In one preferred embodiment, the at least one lateral branch has the stylized design of the arterial portion of the human vascular system, preferably with segmental constrictions and/or expansions being introduced to simulate typical vascular diseases.

In one embodiment of the present invention, the at least one discharge channel on one side is connected to the outer end of the at least one lateral branch, and on the other end of the channel layout opens into the distal section $HSA_{dist}$.

In one preferred embodiment, the length and/or the diameter of the at least one lateral branch and of the at least one discharge channel are/is designed in such a way that the ratio of the summed flow resistance of the at least one lateral branch and of the at least one discharge channel to the flow resistance of the aortic equivalent is such that a homogeneous flow distribution of the fluid introduced via the port ZI takes place on the at least one lateral branch and the aortic equivalent.

In another embodiment of the present invention, a port for a contrast agent injection of a contrast agent introduction system (KMS) is situated above the port ZI in the cover plate. In one preferred embodiment, the contrast agent introduction system (KMS) also includes a contrast agent supply ring, with openings, that allows introduction of a dye into the vascular bed via a connection to the vascular bed, wherein the contrast agent supply ring preferably
   a) is connected to the $HSA_{prox}$ 1.8 cm below the cover plate;
   b) forms an annular cavity that surrounds the $HSA_{prox}$;
   c) has openings that are directed toward the $HSA_{prox}$, and that are preferably slotted contrast agent supply recesses; and/or
   d) a supplying channel connects the contrast agent supply ring to the port for the contrast agent injection.

The present invention further relates to application of the above-described training device with static vascular bed contrasting in a radiological imaging technique, preferably magnetic resonance tomography (MRT), computed tomography (CT), C-arm computed tomography (CACT), rotational angiography (RAX), and/or digital radiography (DX).

In another embodiment, the above-described training device, having dynamic vascular bed contrasting, is applied in imaging methods, preferably magnetic resonance tomography (MRT), computed tomography (CT), C-arm computed tomography (CACT), rotational angiography (RAX), digital radiography (DX), transillumination (TI), and/or digital subtraction angiography (DSA).

The use of the above-described training device further relates to the development, testing, and didactic communication of image-based registration techniques for image fusion.

The present invention further relates to a method for imaging static and/or dynamic fluid motions within the vascular bed of a training device described above. In one embodiment, the fluid within the vascular bed has contrasting to allow imaging of static and/or dynamic fluid motions in the vascular beds in certain imaging methods.

In one embodiment of the present invention, the method for imaging a static fluid motion within the vascular bed of a training device described above includes the following steps:
   i) filling the vascular bed of the above-described training device, via a port ZI, with a fluid that is suitable for the selected imaging technique, preferably involving a radiological imaging technique using a contrasting fluid;
   ii) releasing the air, which escapes due to the filling with the fluid, from the training device via an outlet ZO;
   iii) closing the ports ZI and ZO through which fluid has been introduced into the vascular bed and the air has been released; and
   iv) depicting the training device and/or the contrasted vascular bed using the selected radiological imaging technique, preferably a radiological imaging technique.

In another embodiment of the present invention, the method for imaging the training device using a vascular bed, preferably a dynamically contrasted vascular bed, through which flow passes includes the following steps:
   i) connecting a fluid pump and a fluid reservoir situated thereon to the port ZI of the training device;
   i) connecting a drain to the port ZO, which is connected to the fluid reservoir;
   ii) continuously passing fluid, conveyed via the pump, through the vascular bed from the fluid reservoir, within the vascular bed, and back into the fluid reservoir;
   iii) introducing a contrast agent into the fluid flow, the introduction preferably taking place via a contrast agent injection port; and
   iv) depicting the training device and/or the dynamically contrasted vascular bed, using a selected radiological imaging technique.

In one preferred embodiment, the method for imaging the training device, using a vascular bed through which flow passes, includes as a further step, prior to introducing the contrast agent (step iii), uncontrasted depiction of the training device and/or the fluid-filled vascular bed, using an imaging technique and/or the applied radiological imaging technique, provided that this is followed by a subtraction technique for the latter. The method particularly preferably has an additional step v) in which subtraction imaging is computed by subtracting the uncontrasted depiction from the contrasted depiction.

In one preferred embodiment, steps iii) and iv), i.e., the introduction of a contrast agent into the fluid flow and the depiction of the training device and/or the dynamically contrasted vascular bed using a selected radiological imaging technique, are temporally coordinated, so that, depending on the fluid transport of the pump, i.e., the conveying speed of the fluid, a dilution of the fluid in relation to the contrast agent is still sufficient for the imaging technique.

In one embodiment of the present invention, the method includes the application of image-based registration techniques for image fusion, including the following steps:
   i) imaging the training device, using static and/or dynamic vascular bed contrasting by means of magnetic resonance tomography (MRT), computed tomography (CT), C-arm computed tomography (CACT), rotational angiography (RAX), digital radiography (DX), transillumination (TI), and/or digital subtraction angiography (DSA);
   ii) digitally transmitting the image data to the apparatus, preferably an angiography apparatus, that is selected for applying image-based registration techniques;
   iii) imaging the training device with and/or without vascular bed contrasting; and
   iv) applying at least one image-based registration technique for spatial image fusion of the at least one image generated under i) with the at least one image generated under iii).

In one particular embodiment of the present invention, the at least one image-based registration technique is available on the selected apparatus for image fusion.

The object is further characterized by the embodiments in the claims, and is described in greater detail via the statements in the description, the examples, and the drawings.

Relative terms such as left, right, up, and down are for convenience only and are not intended to be limiting.

LIST OF REFERENCE NUMERALS 1 training device
2 rear side
3 front side
4 cover plate
5 base plate
6 contrast agent injection port (KMI)
7 port ZI
8 port ZO
9 proximal aortic element ($HSA_{prox}$)
10 central aortic element ($HSA_{central}$)
11 reducing aortic element ($HSA_{red}$)
12 distal aortic element ($HSA_{dist}$)
13 contrast agent injection system (KMS)
14 lateral branch (SA)
15 aortic equivalent (HSA)
16 discharge channels (AK)
17 contrast agent supply ring (KMR)
18 vessel expansion
19 supply channel
20 channel that is open toward the cover plate
21 vascular bed
22 objects having a different radiodensity and/or MRT signal intensity (stylized vertebrae)

DETAILED DESCRIPTION OF THE INVENTION

The present invention relates to a training device for simulating a vascular bed with static and/or dynamic fluid motion, preferably for simulating a contrasted static and/or contrasted dynamic fluid motion within the vascular bed.

In the present invention, the term "fluid motion" describes the motion of the fluid within the vascular bed. Even if no motion of the fluid is present, i.e., no flow rate is measurable, this is referred to here as fluid motion. The term "dynamic" describes a vascular bed in which the fluid that is filled into the vascular bed moves within the vascular bed, preferably flows through same. The term "static" describes a vascular bed in which the fluid present within the vascular bed, which has previously been filled, for example, is not in motion; i.e., static fluid motion is present. In the present invention, the terms "contrasted" or "contrasting" describe the addition of at least one material (contrast agent) to the fluid, which may be introduced into the vascular bed and allows the depiction of structures and functions during imaging operations. The contrast agent or dye may also include substances to which an uncontrasted fluid, such as water, may be added. In radiological imaging methods, materials are preferably used as contrast agents which absorb X-rays more strongly or more weakly than normal soft tissue or the body of the training device. Contrast agents include, but are not limited to, materials having the following properties: X-ray positive or X-ray negative contrast agents, gas-filled microbubble contrast agents, and/or positive or negative magnetic resonance tomography contrast agents.

In one embodiment, gas may be led into the vascular bed instead of or in addition to fluid, so that a static and/or dynamic, preferably contrasted static and/or contrasted dynamic, fluid and/or gas motion within the vascular bed may be simulated due to the introduction of the gas.

The term "vascular bed" encompasses a course of the vessels and its vascular structure within a given body area or organ, or a simplified pattern based on same. The vascular structure describes the diameter of the individual vascular sections, the diameter (caliber) between the individual vascular sections being variable. The course of the vessels encompasses central vessels as well as branching of the vessels within given body regions or organs, and discharge channels for ensuring circulation. In principle, the training device has been developed for vascular beds, in particular human vascular beds; however, the invention could also be used for simulating the vascular beds of other living organisms, for example other mammals such as dogs, cats, or horses, in which a certain imaging or treatment technique is to be carried out. The training device offers numerous fields of application in training, as well as enhancement of individual practical skills. Use of a training device is beneficial in particular for imaging techniques and treatment techniques that are to be learned or refined due to the fact that, for example, they are seldom carried out. For the sake of simplicity, in the following description the invention is described with reference to the human vascular bed.

Radiological imaging systems such as angiography apparatuses, but also computed tomography systems and magnetic resonance tomography systems, currently allow functions that extend far beyond strictly object imaging. These include image-based registration of the coordinate system of the radiological imaging system with the coordinate system of image data recorded beforehand, for example from computed tomography, magnetic resonance tomography, or digital radiography (prior images), and consecutive spatial fusion of the two image data sets. Via such fusion, the information present in the prior images may be combined with the image information of the radiological imaging system, based on location, to supplement the content thereof. For the sake of simplicity, in the following description the invention is described with reference to use on the angiography apparatus.

Angiography apparatuses currently allow numerous navigation techniques besides radioscopy for carrying out an intervention. Registered image data, for example prior images, as well as instantaneous transillumination-assisted angiography images may be utilized for the navigation. Applying these navigation techniques to the angiography apparatus involves intensive training, is used primarily for complex interventions, and for learning on a specific angiography system requires application of the navigation techniques to humans or a suitable surrogate.

The present training device is preferably designed in such a way that it allows use of the above-mentioned techniques, such as imaging with magnetic resonance tomography (MRT), computed tomography (CT), C-arm computed tomography (CACT), and rotational angiography (RAX), and two-dimensional depiction using digital radiography (DX), digital subtraction angiography (DSA), and/or transillumination (TI). In addition, the training device is suitable for development and testing of image registration techniques, and may be used for training these techniques. Furthermore, by use of the training device, preferably typical navigation techniques may be developed, tested, applied, and trained on the angiography system. Unlike with known systems, the advantage of the present device is that one device may be used for all imaging techniques. The customary known training devices encompass simulations of vascular trees that have a central flow entry, are open at the ends of the vascular branches, and are situated or placed in a receiving space. The receiving space or container, the same as the vascular tree, is filled with a fluid. In such devices, fluid motion is generated by pumping the fluid into the flow entry or the receiving space per se, and pumping it out of the receiving space. These devices are suitable for testing surgical techniques within the vascular bed. If a liquid or gaseous contrast agent is now introduced into such a system via the flow entry for fluid, the contrast agent escapes into the receiving space immediately after the vascular tree is filled, resulting in undesirable contrasts. This effect distorts the images of the imaging techniques. Thus, imaging that is approximately realistic compared to the body of a human or animal is not possible with these systems. In addition, in such flushed systems, for a dynamically contrasted image the simulation of the vessel course, i.e., the vascular bed, must be flushed by a very large quantity of fluid in order to reduce a superimposition of the vascular bed with the also contrasted surrounding or irrigation fluid during the image recording, by dilution. In the systems having a fluid-filled container, within a very short time this typically results in progressive contrasting of the surrounding fluid, and thus, compromised imaging of the vascular structures in the imaging methods.

In addition, in the configuration of the known systems, static contrasting results in contrasting of the fluid in the receiving space or the container that flushes the vascular bed, since the simulated vessels end in the receiving space or in the container. In contrast, the present invention allows contrasting of only the vascular bed and optionally the communicating structures, such as the discharge channels (AK), as the result of which all imaging techniques, for example magnetic resonance tomography (MRT), computed tomography (CT), C-arm computed tomography (CACT), rotational angiography (RAX), two-dimensional depiction by means of digital radiography (DX), and transillumination (TI) may be used with a device, simultaneously or in direct succession, resulting in an approximately realistic image, since the capability for differentiating vessels in the imaging techniques is maintained.

The device according to the invention manages without a surrounding receiving container that surrounds the body with fluid, so that, in contrast to the known systems, a compact design of the training device is possible, thus allowing miniaturization in comparison to the known devices. Another advantage, of course, is radiation hygiene. Due to the positioning of the technically necessary fluid-filled receiving spaces in the primary beam path in the known systems, unnecessary scattered radiation is formed which has an adverse effect on exposure of involved persons and on the imaging methods. Improved image quality and lower emissions and exposure for investigators are achieved due to the reduced scattered radiation resulting from the design of the present device.

In addition, systems in which the simulations of a course of the vessel in a fluid-filled container are stored cannot be easily vented. Due to the design of the present device, this is possible within a few minutes, usually less than 5 min, with fluid being led directly into the vascular bed via a port ZI (7). Without such venting of the device, imaging using the above-mentioned techniques is not possible or is prone to errors.

Figure 1:
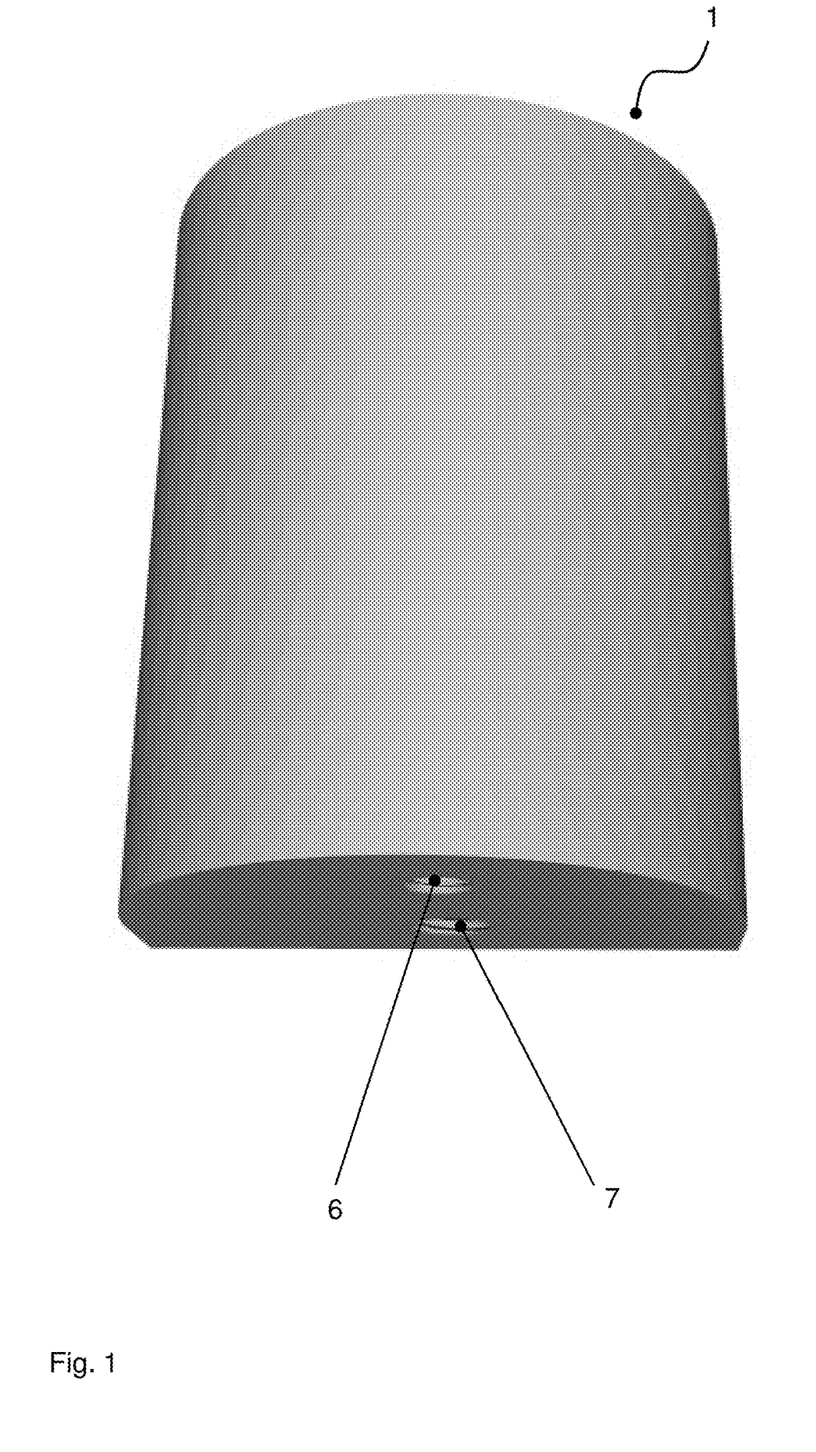
FIG. 1 is a schematic illustration of a top view of a training device according to the invention.

The training device therefore encompasses simulation of a vascular bed, which preferably represents simulation of a human vascular bed of a given region. The vascular bed is situated inside a water-tight body that may be regarded as a housing and that preferably includes a flat support surface, also referred to below as the rear side (2). The rear side (2) or support surface is used to securely support the device; in particular, the flat support surface is intended to prevent the device from moving during trainings. A further aim is to create reproducible conditions. The front side (3) of the training device may have any conceivable shape; however, for the sake of simplicity the front side (3) has a semicylindrical shape that adjoins the rear side (2) and two end plates (4, 5), as is apparent in FIGS. 1, 2, and 3. The end plates (4, 5) are laterally situated on the body, and preferably have a flat design so that potential connections in the areas of the end plates (4, 5) are possible.

Figure 2:
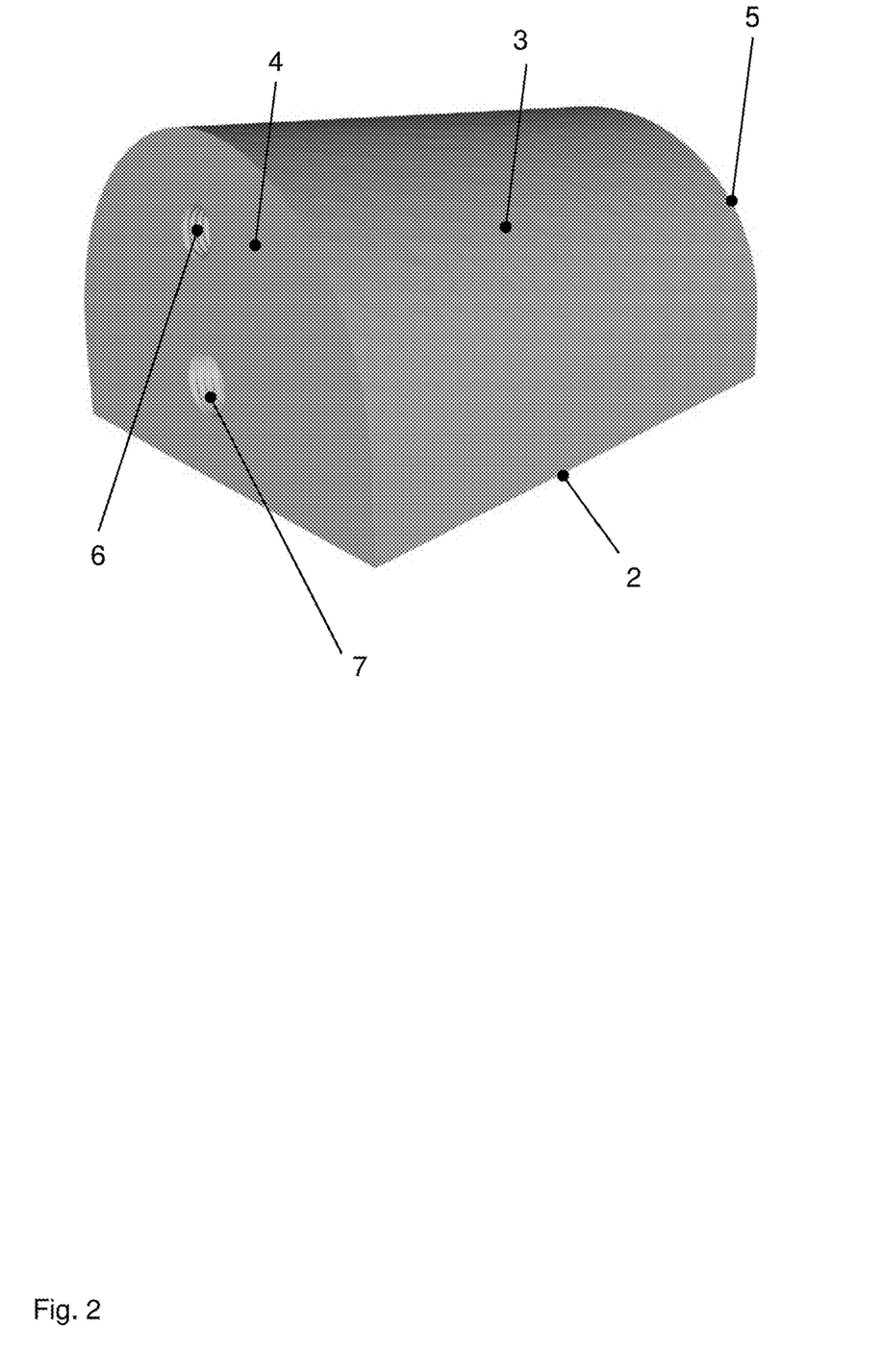
FIG. 2 is a schematic illustration of a view of the cover plate on a training device according to the invention.
Figure 3:
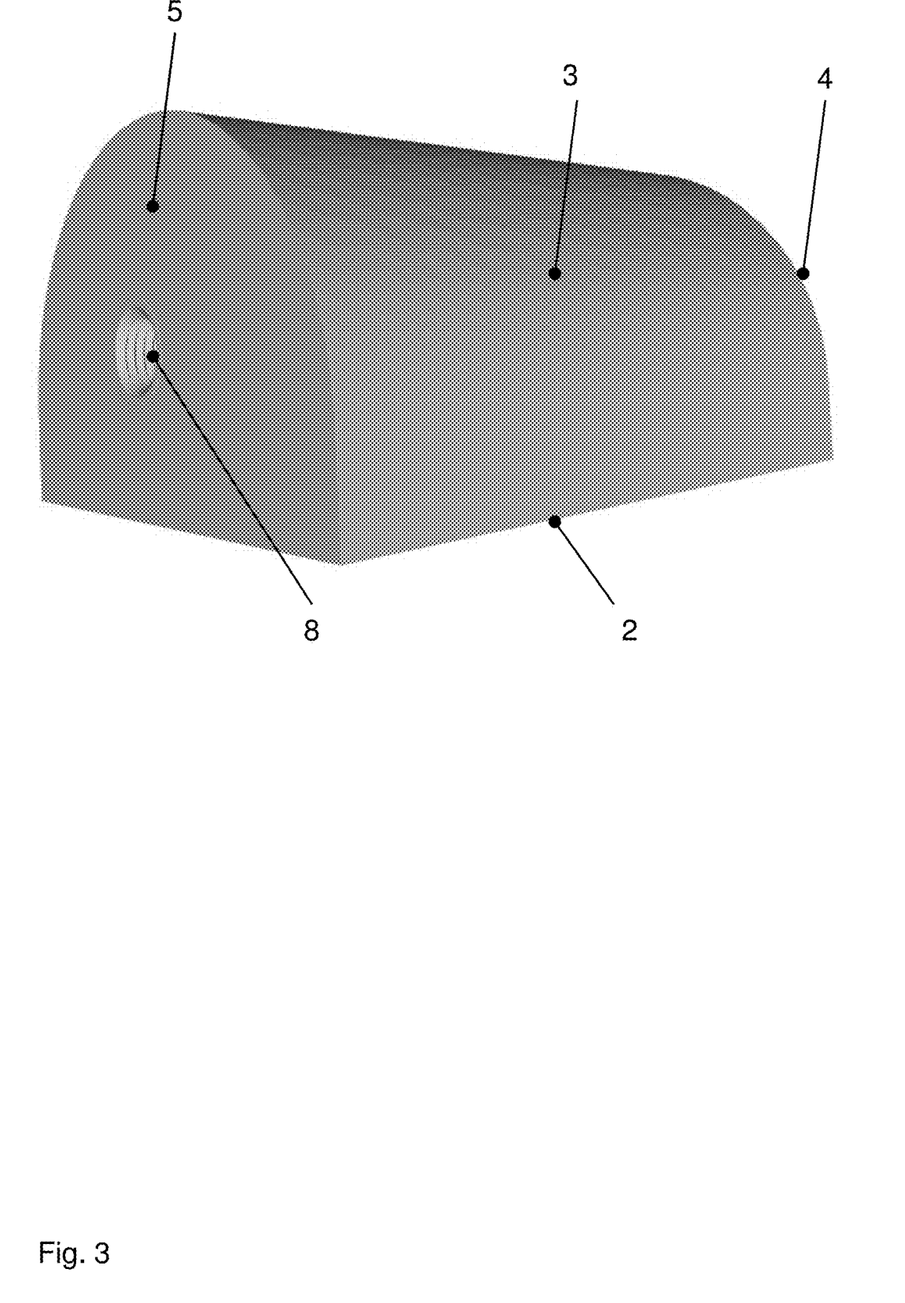
FIG. 3 is a schematic illustration of a view of the base plate on a training device according to the invention.
Figure 4:
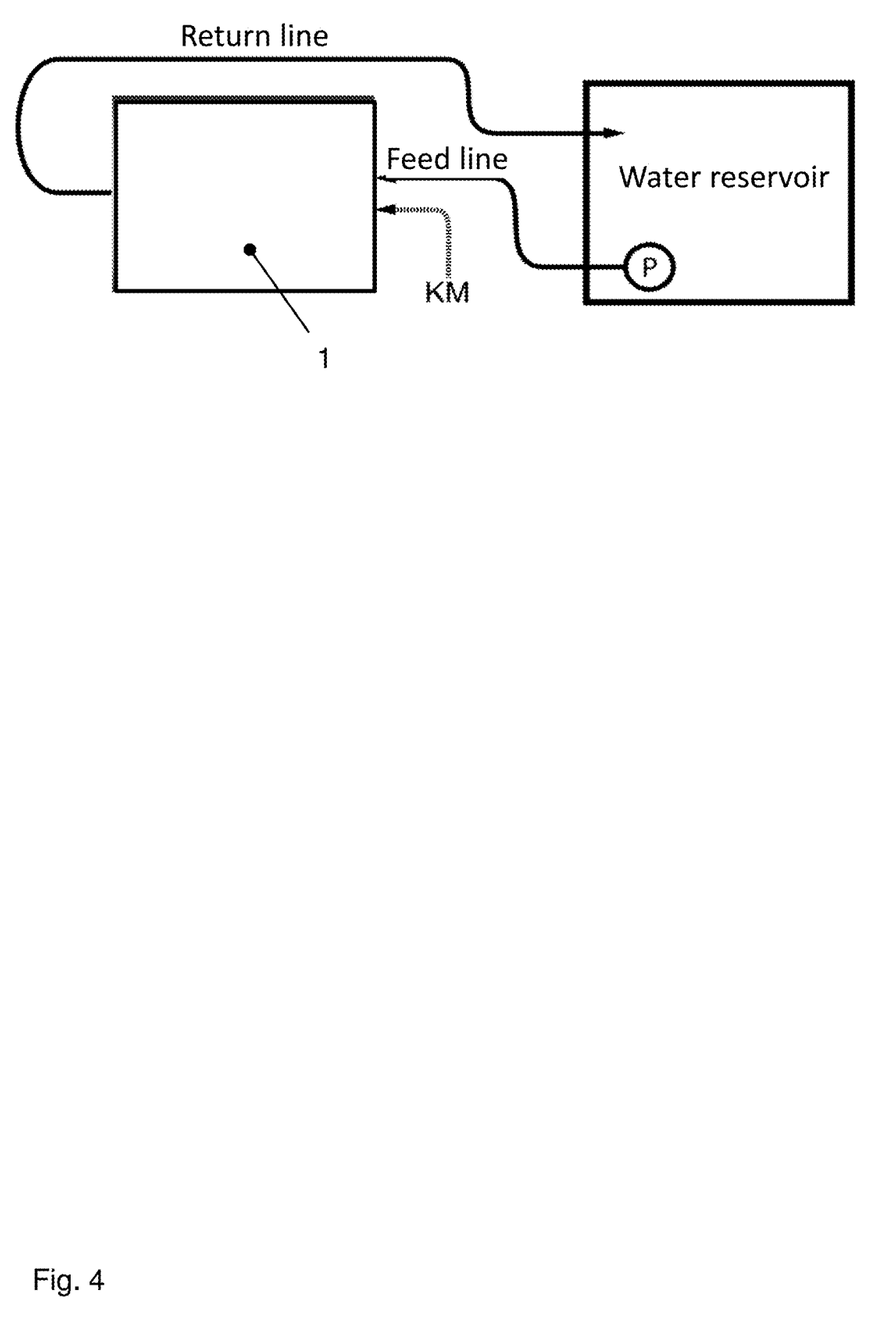
FIG. 4 illustrates an overall design with a water reservoir, pump (P), feed line, contrast agent port (KM), training device (1), and return line (top view).

In one embodiment of the present invention, one end plate includes a port ZI (7) for introducing circulation of a fluid within the vascular bed, and preferably has another port, preferably situated above the port ZI (7), for contrast agent injection (6). The end plate, which has the ports for circulation (port ZI, 7) and for the contrast agent injection (KMI), is referred to below as a cover plate (4). In one embodiment of the present invention the end plate, also referred to as the base plate (5), situated opposite from the cover plate (4) has a hose connection ZO (port ZO, 8) that represents an outlet for the circulation fluid. The hose connections may be known hose connections, wherein an internal thread is preferably introduced into the body. In one particularly preferred embodiment, a separate thread is not introduced into the body, and instead, the areas in the end plates at which appropriate ports are to be present already have corresponding integrated recesses, which preferably represent an internal thread and allow joining to a hose connection having a complementary external thread. The size of the port openings depends on the pump used; however, ZI and ZO preferably have an inner diameter of 16 mm. Due to the lower flow volumes, the contrast agent injection (KMI) is somewhat smaller and preferably has an inner diameter of 12 mm.

The body of the training device is preferably made of a solid, water-tight material; the aim is to allow manufacture of the body by three-dimensional (3D) printing to keep the manufacturing costs relatively low. The material used for the body should also have the property of having homogeneous fat to soft tissue density values in computed tomography (CT). The body thus has homogeneous hypodense properties in computed tomography (CT). In imaging methods such as CT, "hypodense" describes image areas having a reduced optical "density." The term "hypodense" may refer either to the density of the surrounding tissue or to the "normal" density of the structure under consideration. Such a radiodensity with homogeneous fat to soft tissue density is preferably in the range of −30 to 100 Hounsfield units for a 120 kV tube voltage, particularly preferably in the range of −30 to 100 Hounsfield units for a tube voltage of 120 kV. In magnetic resonance tomography, the body preferably or alternatively has a hypointense signal characteristic in comparison to fat. In one embodiment, the material used is a rigid synthetic resin that is lightweight and thus ensures portability of the training device. Furthermore, additional transparency of the body may represent a training advantage, since the vascular bed and the fluid flow may be observed. In one embodiment, in this regard the body of the device is thus made of a transparent material. In one preferred embodiment, however, a suitable dye is added to the synthetic resin to eliminate the transparency and limit the visibility of the vascular bed. In one preferred embodiment, without contrasting, the radiodensities of the body and of the water-filled vascular bed are not significantly different from one another. Although there may be slight deviations in the radiodensity when different materials or materials from different manufacturers are used, these are marginal and do not play a relevant role in transillumination and angiography. In addition, when the vascular bed, i.e., the cavities within the body, is/are filled with water, the vascular bed is not visible or contrasting in comparison to the body during transillumination.

Figure 5:
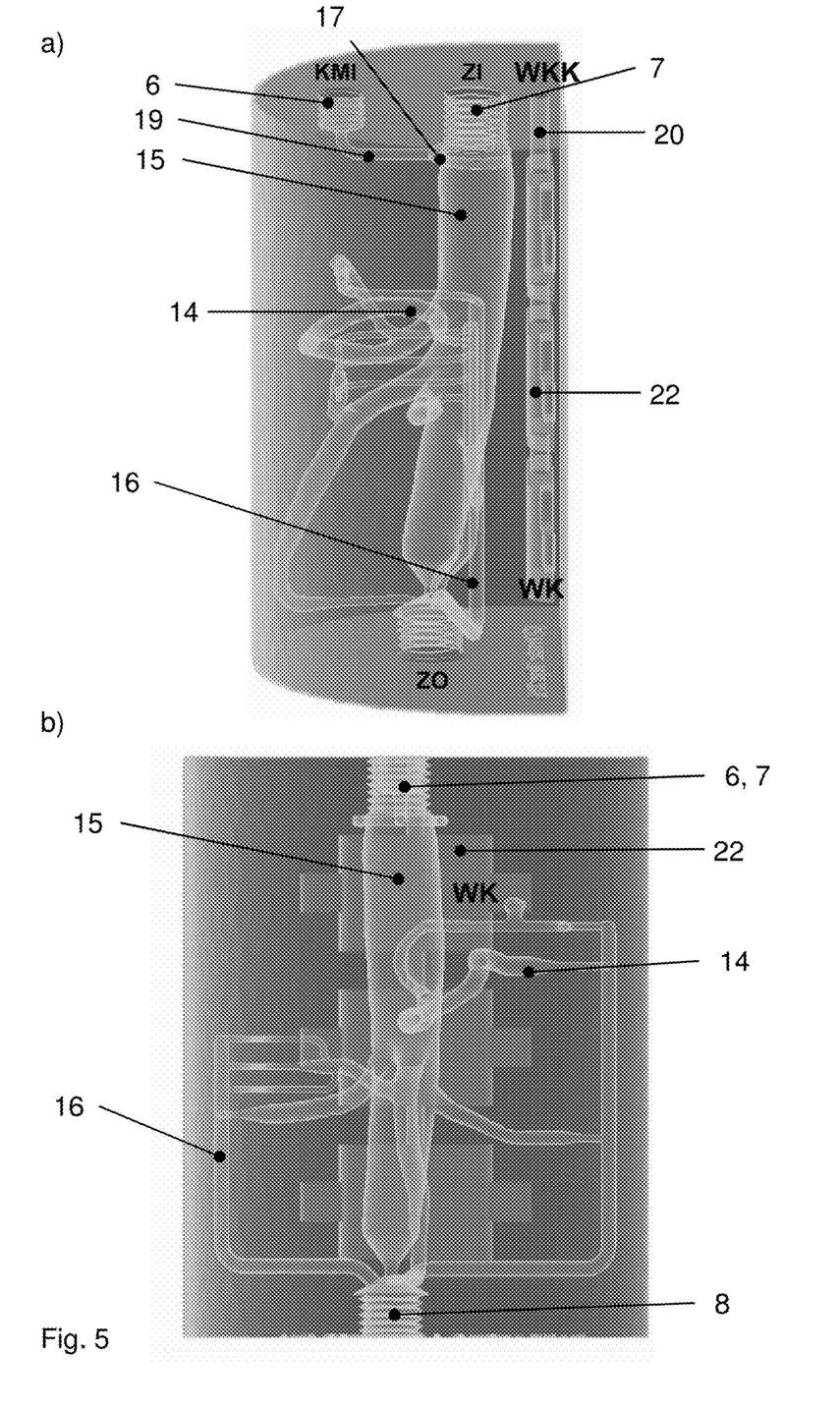
FIG. 5 is a schematic illustration of a 3D rendering of the 3D template of the training device, side view (a) and front view (b) of a training device according to the invention. Port ZI (ZI); port ZO (ZO), contrast agent injection port (KMI); channel from the cover plate to the cavity of the stylized vertebrae (WKK, 20); stylized vertebrae with their transverse processes (WK, 22).

In one embodiment, multiple objects (22) representing stylized vertebrae with their transverse processes are integrated into the body in the area of the rear side (2) of the training device, as is apparent in FIG. 5. The objects (22) are adjacently situated at the base of the rear side, and are filled with a filling material having a different radiodensity compared to the body and/or the vascular bed. "Different radiodensity" refers to materials having a higher radiodensity than the body and/or the vascular bed, or materials having a lower radiodensity than the body and/or the vascular bed. For the selection of the material, it is important that the objects in the imaging techniques can be distinguished from the remaining material of the body and/or the vascular bed. Accordingly, the difference between the radiodensities of the materials of the body and/or vascular bed and the object (22) is preferably greater than 15% in Hounsfield units for a tube voltage of 120 kV. The filling material inside the objects (22) may be any known material, also a gas; however, in one preferred embodiment the filling material is a curing silicone or is the same material as the body, to which substances that change the radiodensity have been added. The substances are preferably substances with a high radiodensity, preferably barium sulfate salt. In one particularly preferred embodiment, the radiodensity of the at least one object (22) is in the range of 400-1600 Hounsfield units for a tube voltage of 120 kV in computed tomography (CT), as the result of which the objects (22) are also visible in other radiological imaging techniques. In one particularly preferred embodiment, the objects (22) are three rectangular objects that are rounded on the top side. The objects (22) are preferably connected due to an elongated shape, each of the objects also having extensions on the sides. The objects (22) inside the body are used for imaging contour-defining structures, which also occur within the human body. The at least one object (22) may also be used as a so-called registration object, since it is visible in the CT, CACT, RAX, DX, DSA, and TI radiological imaging techniques. When curing silicone, for example, as filling material for the objects (22) is selected as the embodiment, visibility of the objects in MRT is also provided. This visibility of the at least one object (22) allows image fusion of image information from various radiological imaging techniques, so that the training device may be used by the user for development, testing, or learning of registration techniques, using the object (22) and/or the three-dimensional vascular bed (21). In one preferred embodiment, the at least one object (22) has a higher radiodensity than the body or the water-filled vascular bed, with and without contrasted fluid motion, thus allowing simulation of digital subtraction angiography, in which subtraction of bones, for example, represented by the at least one object (22), from dynamically contrasted vascular structures takes place. Furthermore, in one particularly preferred embodiment the at least one object (22) is always situated at the exact same location in the body in the devices according to the invention, so that images from the imaging techniques may be regarded as representative for all devices in the series, and thus, registrations of CT, MRT, or CACT images may be applied using commercially available two-dimensional or three-dimensional registration techniques, without the need for individual imaging of each device.

The vascular bed (21), which is situated inside the body, has a three-dimensional design and is connected to the at least two port openings, i.e., the inlet opening (port ZI, 7) and the outlet opening (port ZO, 8) for the fluid. In one embodiment of the present invention, the vascular bed includes an aortic equivalent (HSA, 15), at least one lateral branch (SA, 14), and at least one discharge channel (AK, 16), as is apparent from FIG. 6. In one preferred embodiment, in an imaging depiction such as radiological transillumination, the vascular bed as well as the vessel contours of the training device cannot be differentiated from the surrounding body with the human eye, when filled with water and without introduction of contrast agent.

Figure 6:
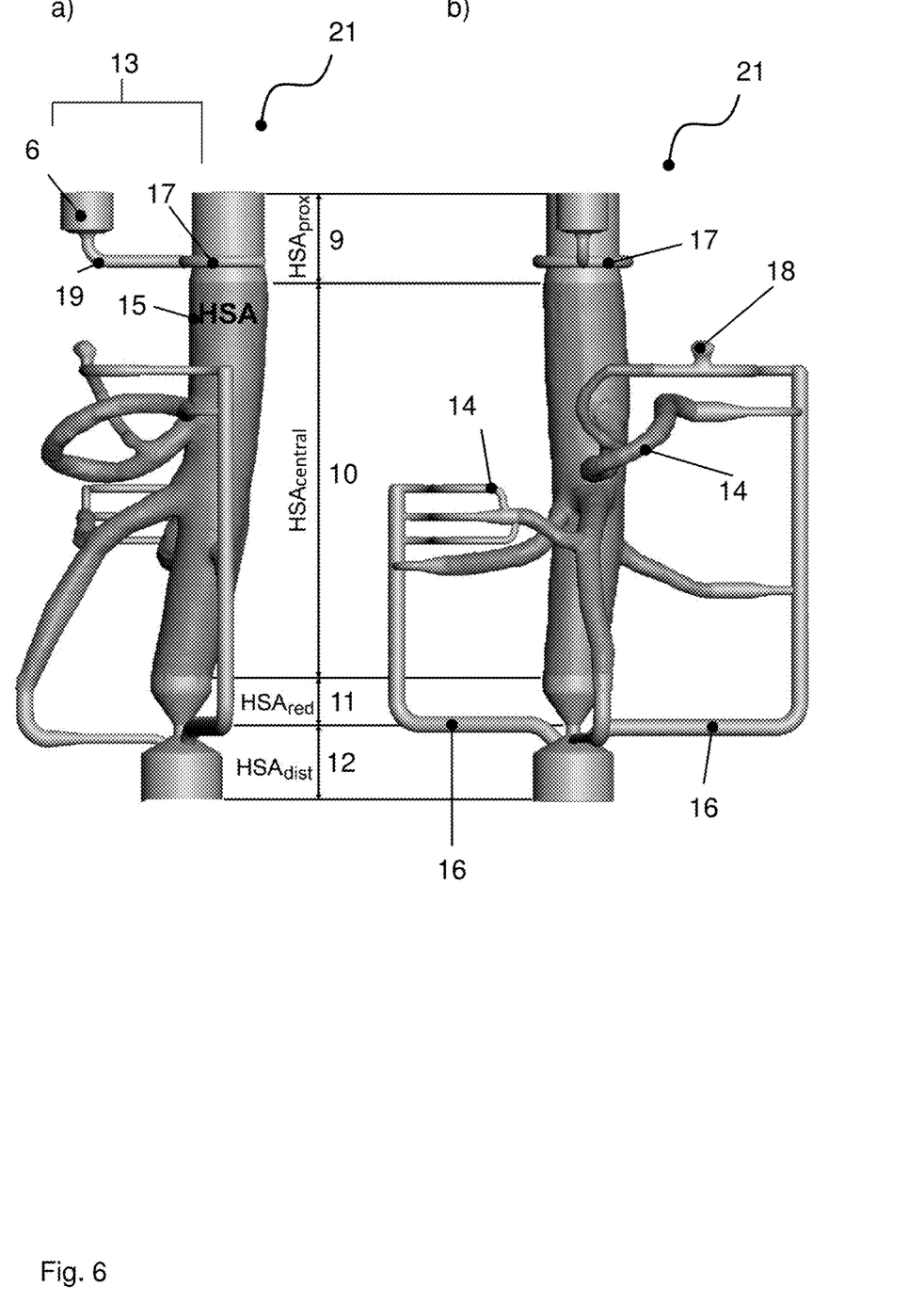
FIG. 6 is a schematic illustration of a 3D rendering of the 3D template of the vascular bed, side view (a) and front view (b). Illustration of the sections of the vascular bed (GB), made up of the central aortic element HSA with a total of four sections: $HSA_{prox}$, $HSA_{central}$, $HSA_{red}$, and $HSA_{dist}$.

In one preferred embodiment, the central aortic equivalent (15) is made up of four sections. The proximal cylindrical section ($HSA_{prox}$, 9) begins directly below the cover plate (4) and particularly preferably has a length of 2 cm. The proximal cylindrical section ($HSA_{prox}$, 9) is connected to a pump outlet via the inlet connection for circulation (port ZI, 7), so that fluid may flow through the aortic equivalent (HSA, 15) via the preferably externally situated pump. A central portion of the HSA ($HSA_{central}$, 10) is situated at the $HSA_{prox}$ (9). The $HSA_{central}$ (10) preferably has a length of 10 cm. The $HSA_{central}$ (10) is followed by the short, funnel-shaped reduction section of the HSA ($HSA_{red}$, 11). The section $HSA_{red}$ (11) has a length of 0.5 to 2 cm, preferably a length of 1.5 cm. Toward the base plate (5), the $HSA_{red}$ (11) is adjoined by the distal section of the HSA ($HSA_{dist}$, 12), which preferably has a length of 1 cm. The $HSA_{dist}$ is situated at the outlet connection for the circulation fluid (port ZO, 8), and is connected to a water reservoir by means of a hose.

Lateral branches (14) which form the flow entry and preferably represent the arterial portion of the human vascular system in a stylized manner branch off from the $HSA_{central}$ (10) in places. In one embodiment, the lateral branches (14) have segmental constrictions and/or expansions (18) for the purpose of simulating vascular diseases. In one preferred embodiment, the lateral branches (14) are designed in such a way that the branches contained therein are placed in a targeted manner so that in a frontal representation, due to occurring superimposition phenomena they cannot be adequately differentiated as such branchings, as is apparent in FIG. 6. Such an imaging property may be used didactically for illustrating the benefit of three-dimensional vascular depictions or oblique projections in projection radiographic angiography.

To allow a flow or flow entry of water from the aortic equivalent (15) into the lateral branches (14), in one embodiment the lateral branches at their outermost ends, i.e., the ends farthest from the branch point at the aortic equivalent (15), are connected to discharge channels (AK, 16). The discharge channels (AK, 16) extend in the direction of the base plate (5) and open into the $HSA_{dist}$ (12). The length and/or diameter of the discharge channels (16) are/is dimensioned in such a way that the ratio of the summed flow resistance of the lateral branches (14) and of the discharge channels (16) to the flow resistance of the aortic equivalent (15) is such that a homogeneous flow distribution of the fluid, introduced via the inlet (port ZI, 7), to the lateral branches (14) and the aortic equivalent (15) takes place, the flow resistance of the aortic equivalent (15) preferably being determined via the section $HSA_{red}$ (11) which, as described above, has an hourglass-shaped constriction that results in caliber reduction, i.e., a reduction of the inner diameter (caliber).

In one embodiment of the present invention, the vascular bed is connected to the contrast agent introduction system (KMS, 13). This contrast agent injection system (KMS) includes multiple channels that open into the $HSA_{prox}$ (9), preferably 1.8 cm below the cover plate (4). The contrast agent introduction system (KMS, 13) includes a port for the contrast agent injection (KMI, 6) and a contrast agent supply ring (KMR, 17). In one preferred embodiment, the contrast agent supply ring (KMR, 17) is an annular cavity that surrounds the $HSA_{prox}$ (9). To avoid unnecessary resistance to the flowing fluid or to keep the flow resistance as low as possible, supply lines having large diameters are advantageous since they allow operation of the device with a low injection pressure. Introducing the contrast agent into the fluid stream by admixture in the supply lines outside the device would require fairly large quantities of contrast agent in order to homogeneously contrast the inflowing fluid. For contrasting by means of a catheter in the device, a feed line for mixing the fluid and the contrast agent in the HSA is necessary to achieve homogeneous contrasting, which would require a larger design. The present invention therefore includes an annular contrast agent supply (KMR, 17) via which the contrast agent may be injected at low pressure and direct intermixing takes place.

In addition, the contrast agent supply ring (17) preferably includes multiple openings that are oriented in the direction of the $HSA_{prox}$ (9) and that allow contrast agent to be supplied into the aortic equivalent (15). The openings are preferably slotted contrast agent supply recesses that allow delivery of a contrast agent into the aortic equivalent (15). The lateral arrangement of the contrast agent supply openings results in turbulent intermixing of the fluid, flowing through the aortic equivalent (15), with the supplied contrast agent, thus already ensuring homogeneous contrasting of the fluid in the $HSA_{prox}$ (9). Due to such a controlled distribution within the $HSA_{prox}$ (9), and thus over the aortic equivalent (15) and the lateral branches (14), a likewise homogeneous contrast agent distribution is achieved in the overall vascular bed. In one preferred embodiment, the contrast agent supply ring has four contrast agent supply openings with an angular distance of 90 degrees. A supplying channel (19) to the contrast agent supply ring (17) connects same to the port for contrast agent injection (KMI, 6), and allows contrast agent injection into the aortic equivalent (15) via the contrast agent supply openings. Homogeneous, essentially concurrent or directly successive contrasting of the central portion of the HSA ($HSA_{central}$, 10) and of the lateral branches (14) is achieved with the aid of the lateral slots that are oriented at an angle opposing the fluid stream. Furthermore, due to such an arrangement no additional material, such as a catheter for introducing the contrast agent, is necessary, so that disposable material is saved and solid waste is avoided. Such a contrast agent introduction system also allows the use of gaseous contrast agents such as ambient air or $CO_2$, so that iodine-containing contrast agents may be largely dispensed with.

By use of the contrast agent system (KMS, 13) it is possible to bring about contrasting in a targeted manner, and thus, in one embodiment also to allow controlled dynamic contrasting of the fluid within the vascular bed, which permits three-dimensional depiction of the training device and its components in the imaging techniques without superimposition of the vascular structures over time, with discharge of the contrasted fluid, preferably via targeted lateral discharge. In one embodiment of the present invention, for example in the case of dynamic contrasting, first the vascular bed, and subsequently the communicating structures, in particular the discharge channels (AK, 16), are contrasted. As a result, the capability for differentiating vessels is retained in all imaging techniques, in particular magnetic resonance tomography (MRT), computed tomography (CT), C-arm computed tomography (CACT), rotational angiography (RAX), and two-dimensional depiction by means of digital radiography (DX) and transillumination (TI), at all times of the image recording.

Other advantages of the controlled feed of the contrast agent fluid are the small volume of the contrast agent and of the irrigation fluid, as well as the controlled disposal of the contrasted and thus contaminated irrigation fluid. The device allows complete, concurrent contrasting of the entire aortic equivalent (HSA, 15) and the lateral branches in angiography, using only 10 mL of contrast agent. Contrasting that is sufficiently homogeneous and persistent over the recording time of the CT angiography, C-arm CT, or rotational angiography is possible with only 20 mL of contrast agent in the present device, thus minimizing contamination of the irrigation fluid. The low volume of only 1 to 2 liters of irrigation fluid allows disposal that conserves resources but is still legally compliant. The disposal costs are largely determined by the volume; therefore, the selected technical implementation represents an environmentally friendly and cost-optimized approach.

To avoid escape of the contrast agent and the fluid inside the vascular bed into the body, the connections between the individual sections of the aortic equivalent (15), of the contrast agent injection system (KMS), and between the aortic equivalent (15) and the contrast agent injection system (KMS) are sealed fluid-tight. The inlet points and/or outlet points of fluids and/or contrast agents are the inlet connection opening ZI (port ZI, 7), the outlet connection ZO (port ZO, 8), and the port for the contrast agent injection (port KMI, 6).

The device according to the invention allows depiction of vascular structures that is free of superimposition. To realize contrasting of the vascular bed that is homogeneous, i.e., simultaneously achieved in a complete and timely manner, by optimizing the diameter and length the summed flow resistance of the vascular bed and of the downstream discharge channels (AK, 16) has been designed in such a way that concurrent, homogeneous contrasting takes place in all vascular branches of the aortic equivalent (15). Therefore, the internal structures, as described above, preferably have the following design:

The central portion of the HSA ($HSA_{central}$, 10) that adjoins the proximal cylindrical section ($HSA_{prox}$, 9) has a length of 10 cm. The proximal cylindrical section ($HSA_{prox}$, 9), which begins directly below the cover plate (4), has a length of 2 cm. The reduction section of the HSA ($HSA_{red}$, 11) follows the $HSA_{central}$ (10) and has a length of 1.5 cm. The distal section of the HSA ($HSA_{dist}$, 12), which preferably has a length of 1 cm and is connected to the outlet connection, faces the base plate (5). Possible lateral branches (14) at their outermost ends, i.e., the ends farthest from the branch point at the aortic equivalent (15), are connected to discharge channels (AK, 16) that extend in the direction of the base plate (5) and open into the HSA$_{dist}$ (12).

In one preferred embodiment, the training device is implemented by three-dimensional segmentation based on a computer tomography data set that is used as a template for the vascular bed of the training device. In one preferred embodiment, this involves three-dimensional segmentation of the human abdominal artery and its lateral branches (truncus coeliacus, arteria mesenterica superior, renal arteries). To achieve the imaging properties of the training device and to adapt the flow properties of the aortic equivalents (15) and the lateral branches (14) to be formed to the flow distribution and its intermixing behavior, using a contrast agent, the segmentation of the vascular bed, preferably of the abdominal artery, is adapted to form a stylized anthropomorphic aortic equivalent (15). In one preferred embodiment, the segmentation of the HSA$_{central}$ and of the human lateral branches takes place in 3D image processing software and computer-based design software (CAD software), and the image thus processed is fused to form a digital 3D template by means of an STL interface. In one particularly preferred embodiment, the training device is produced by three-dimensional printing, preferably using a resin, particularly preferably a laser light-curing synthetic resin, as the material. To allow objects (22) having a different radiodensity (9), preferably a higher radiodensity, compared to the body and/or the vascular bed, such as stylized vertebrae, to be inserted into the body, in one embodiment a cavity that corresponds to the position of the objects is provided with a channel (20) that is open toward the cover plate to allow filling of the cavity after the printing. After the cavity is filled with a filling material, preferably a material having a radiodensity that is different from the body and/or the vascular bed, particularly preferably having a higher radiodensity of 400-1600 Hounsfield units, the channel is preferably closed with the filling material or the material of the training device that is used for manufacturing the body.

The training device described above and the associated manufacturing method result in one particularly preferred embodiment for a training device having the following anthropomorphic properties:
 (i) The training device has a three-dimensional vascular structure with a human-like configuration;
 (ii) The vessels of the training device have branchings, so that effects of the three-dimensional vascular depiction may be imaged onto the course of an intervention;
 (iii) In transillumination, the vessel contour of the training device cannot be differentiated from the surrounding body with the human eye, when filled with water and without introduction of contrast agent;
 (iv) The vascular bed preferably has typical changes in the vessel widths, such as expansions and/or constrictions due to vascular diseases;
 (v) The training device has flow through the vascular bed which is similar enough to the blood flow, preferably the blood flow of the human body, to allow contrast agent depictions by direct contrast agent injection;
 (vi) The training device has suitable properties for applying image fusion techniques, wherein the device preferably
  is usable in magnetic resonance tomography (MRT), computed tomography (CT), C-arm CT (CACT), three-dimensional rotational angiography (RAX), digital radiography (DX), digital subtraction angiography (DSA), and transillumination (TI);
  has structures that are visible in magnetic resonance tomography (MRT) and/or computed tomography (CT), C-arm CT (CACT), three-dimensional rotational angiography (RAX), digital radiography (DX), digital subtraction angiography (DSA), and transillumination (TI);
  the structures are configured in such a way that they allow conclusions to be drawn concerning the position of the training device in space, i.e., rotation in all three planes;
 (vii) The training device allows controlled introduction of suitable contrast agents into the vascular bed; and
 (viii) High reproducibility of the imaging of the training device in CT and/or in MRT.

The present invention further relates to the application of the above-described training device with static vascular bed contrasting in a radiological imaging technique, preferably magnetic resonance tomography (MRT), computed tomography (CT), C-arm computed tomography (CACT), rotational angiography (RAX) and/or digital radiography (DX). The training device is filled via the port ZI (7) with a contrast agent, preferably diluted, that is suitable for the selected radiological imaging technique. The air present in the training device preferably escapes via a hose that is connected to the port ZO (8). When the training device is completely filled with contrast agent, the ports ZI (7) and ZO (8) are closed via a suitable means. The port for the contrast agent injection (6) preferably remains unused in this application. After the training device is filled, static depiction of the contrasted vascular bed takes place, using the stated radiological imaging techniques. Upon completion, in one embodiment the vascular bed may be emptied by opening the ports ZI (7) and ZO (8) and preferably flushed using a suitable means such as water.

In another embodiment, the above-described training device, having dynamic vascular bed contrasting, is used in imaging methods, preferably magnetic resonance tomography (MRT), computed tomography (CT), C-arm computed tomography (CACT), rotational angiography (RAX), digital radiography (DX), transillumination (TI), and/or digital subtraction angiography (DSA).

The pump outlet of a fluid pump is mounted at the port ZI (7) of the training device, the fluid pump being connected to a fluid reservoir, preferably a water reservoir. An appropriate connection may be a hose or a similar connection. The fluid pump may be a pump in a fluid reservoir, or may include a pump that is situated outside a fluid reservoir. In one preferred embodiment, the pump output should be 1 to 10 liters per minute in order for continuous flow to pass through the vascular bed. In one particularly preferred embodiment, the flow rate of the pump may be adapted to the needs of the vascular depiction. The fluid led from the fluid reservoir into the training device at the port ZI (7) flows through the vascular bed contained in the body of the training device, and leaves the training device at the port ZO (8). In one preferred embodiment, the fluid that is delivered to the outlet ZO (8) is led back into the fluid reservoir with the aid of a hose connected thereto. Such continuous flow through the training device simulates the blood flow. In another embodiment, the training device is positioned in an imaging apparatus, for example an angiography apparatus, a computed tomography system, or a magnetic resonance tomography system. For the radiological imaging technique in question, a suitable contrast agent is injected into the training device via the contrast agent injection port (6) for the duration of the imaging recording via the contrast agent injection port (6), thereby generating temporary homogeneous contrasting of the vascular bed present in the training device. In one preferred embodiment, the contrast agent in the fluid reservoir is greatly diluted, analogously to the human blood volume, with the outflow of the contrasted fluid via the port ZO (8), thus allowing multiple sequential vascular depictions, until the fluid used for the flowthrough must be replaced due to noticeable contrasting. After the use is concluded, the fluid in the reservoir is preferably disposed of and the training device is flushed with a suitable means such as water in order to prevent agglutinations of the contrast agent in the training device.

The use of the above-described training device further relates to the development, testing, and didactic communication of image-based registration techniques for image fusion. As stated above for the device, the training device is preferably made of a material that has low radiopacity in computed tomography and that has low signal intensity in magnetic resonance tomography. Preferably situated in the flat rear side of the training device is at least one object (22) having a different radiodensity, preferably a higher radiodensity, compared to the material of the body, which is intended to depict stylized vertebrae with their transverse processes. In one embodiment, the at least one object (22) is filled with a silicone-based material to which barium sulfate is added to ensure visibility in the X-ray-based imaging method (CT, CACT, RAX, DX, DSA, and TI) as well as visibility in MRT. If the imaging of the training device now takes place without filling the vascular tree and/or applying static and/or dynamic vascular contrasting, the stylized vertebra or the object (22) may be differentiated in the generated images in such a way that it may be utilized as an object for image-based object registration with regard to the position in space. This visibility may be used for registration of various images from various imaging modalities, such as computed tomography and transillumination or also magnetic resonance tomography and C-arm computed tomography. Relevant temporary deformation may be essentially excluded due to the rigidity of the training device.

The present invention further relates to a method for imaging static and/or dynamic fluid motions in the vascular bed of a training device described above. In one embodiment, the fluid within the vascular bed has contrasting to allow imaging of static and/or dynamic fluid motions in vascular beds in given imaging methods.

In one embodiment of the present invention, the method for imaging a static fluid motion within the vascular bed of a training device described above includes the following steps:
 a) filling the vascular bed of the training device with a fluid, including a contrast agent, that is suitable for the selected radiological imaging technique, by means of a port ZI (7);
 b) releasing the air, escaping due to the filling of the fluid, from the training device by means of an outlet ZO (8);
 c) closing the ports ZI (7) and ZO (8) through which fluid has been introduced into the vascular bed and the air has been released; and
 d) statically depicting the contrasted vascular bed using imaging techniques, preferably radiological imaging techniques.

In one preferred embodiment, the contrast agent used is preferably diluted iodine-containing and/or gadolinium-containing solutions. In another embodiment, as a final step the vascular bed is flushed with a suitable solution to remove contaminants inside the vascular bed.

In another embodiment, the method relates to the imaging of the training device using a vascular bed through which flow passes, preferably a dynamically contrasted vascular bed, following steps:
 a) connecting a fluid pump, and a fluid reservoir situated thereon, to the port ZI (7) of the training device;
 b) connecting a drain to the port ZO (8), which is connected to the fluid reservoir;
 c) continuously passing fluid, conveyed via the pump from the fluid reservoir, through the vascular bed, and passing the fluid inside the vascular bed back into the fluid reservoir;
 d) introducing a contrast agent into the fluid flow, the introduction preferably taking place via a contrast agent injection port (KMI, 6); and
 e) dynamically depicting the contrasted vascular bed using imaging techniques, preferably radiological imaging techniques.

In one embodiment of the method, the continuous flow through the vascular bed has a flow rate of 1 to 10 liters per minute. In one particularly preferred embodiment the fluid is water. The contrast agent is preferably injected into the training device via the contrast agent injection port (6) for the duration of the imaging recording, thereby generating temporary homogeneous contrasting of the vascular bed present in the training device. In one preferred embodiment, the contrast agent in the fluid reservoir is greatly diluted, analogously to the human blood volume, with the outflow of the contrasted fluid via the port ZO (8), thus allowing multiple sequential vascular depictions, until the fluid used for the flowthrough must be replaced due to noticeable contrasting. After the use is concluded, the fluid in the reservoir is preferably disposed of and the training device is flushed with a suitable means such as water in order to prevent agglutinations of the contrast agent in the training device.

In one embodiment, an alternative method includes the application of image-based registration techniques for image fusion, including the following steps:
 a) creating a vascular bed with static fluid motion in one of the above-described training devices or a vascular bed through which flow passes, with or without contrasting;
 b) imaging the training device in computed tomography (CT), C-arm CT (CACT), magnetic resonance tomography (MRT), rotational angiography (RAX), digital radiography (DX), digital subtraction angiography (DSA), or transillumination (TI);
 c) transmitting the superimposition imaging, generated under b), to a selected apparatus for training for applying image-based registration techniques;
 d) imaging the training device with and/or without vascular bed contrasting; and
 e) applying at least one image-based registration technique for spatial image fusion of the at least one image generated under a) with the at least one image generated under d).

The apparatus selected in step c) for the image-based registration techniques is preferably an angiography apparatus. A C-arm computer tomographic (CACT) depiction or a transillumination in two planes particularly preferably takes place in the angiography apparatus. The application of at least one image-based registration technique for the spatial image fusion in step e) preferably includes the use of registration software of the angiography apparatus in question that is used, in order to match the objects (22) that are visible in the superimposition imaging with the objects (22)

that are visible in the transillumination (TI) or C-arm computer tomography (CACT) images in order to generate a registration matrix from same. The registration matrix is subsequently used for correct superimposition of the image information contained in the superimposition images. The images that result under step b) are referred to as superimposition images.

In one particular embodiment of the present invention, the at least one image-based registration technique is available on the selected apparatus for image fusion.

These and other embodiments of the present invention are disclosed in the description and the examples, and are encompassed by same. In addition, the features stated in the above description and in the claims may be combined in any given selection, and the feature combinations that are meaningful within the scope of the invention are regarded as disclosed. Further literature concerning known materials, methods, and applications that may be used in accordance with the present invention may be retrieved from public libraries and databases, for example using electronic apparatuses. A more complete understanding of the invention may be obtained by reference to the figures and examples, which have been provided for the purpose of illustration and which are not intended to limit the scope of the invention.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A training device for simulating a vascular bed with static, dynamic, contrasted static, and contrasted dynamic fluid motion within the vascular bed for representation in imaging techniques, encompassing simulation of a vascular bed that is situated within a body, wherein two openings for connecting or filling are situated directly on the body at opposite sides of the body, namely, the cover plate and the base plate, to allow a flow of fluid through the vascular bed, and wherein the device has a flat support surface, in the area of which at least one object having a different radiodensity in comparison to the body which is made of synthetic resin and the vascular bed is situated within the device, and wherein a port for a contrast agent injection of a contrast agent introduction system is situated above the one of the two openings for filling, wherein the contrast agent introduction system is designed to include a contrast agent supply ring surrounding a proximal cylindrical section, wherein the contrast agent supply ring has openings designed as slotted contrast agent supply recesses directed toward the proximal cylindrical section, that allows introduction of a dye into the vascular bed via a connection, wherein the contrast agent supply ring forms an annular cavity that surrounds the proximal cylindrical section and is connected to the port for the contrast agent injection via supplying channel connects and wherein the at least one discharge channel on one side is connected to the outer end of the at least one lateral branch, and on the other end of the channel layout opens into the distal section, wherein the length and/or the diameter of the at least one discharge channel are/is designed in such a way that the ratio of the summed flow resistance of the at least one lateral branch and of the at least one discharge channel to the flow resistance of the aortic equivalent is such that a homogeneous flow distribution of the fluid introduced via the port takes place on the at least one lateral branch and the aortic equivalent, and wherein further the aortic equivalent is made up of four sections:
   i) the proximal cylindrical section that directly adjoins the cover plate;
   ii) a central section that adjoins the proximal cylindrical section;
   iii) a section, following the central section, that results in a caliber reduction; and
   iv) a distal section that adjoins the port in the base plate.

2. The training device according to claim 1, wherein the at least one object having a different radiodensity
   a) has the shape of stylized vertebrae with transverse processes;
   b) has a higher radiodensity than the body and/or the vascular bed, wherein the radiodensity is 500-1600 Hounsfield units in computed tomography;
   c) in addition has a higher magnetic resonance tomography signal intensity compared to the body and/or the vascular bed; and/or
   d) is connected to other structurally identical objects.

3. The training device according to claim 1, wherein the vascular bed has a three-dimensional design and includes a central aortic equivalent, at least one lateral branch, and at least one discharge channel.

4. The training device according to claim 1, wherein
   a)
      i) the proximal cylindrical section has a length of 2 cm;
      ii) the central section that adjoins the proximal cylindrical section has a length of 10 cm;
      iii) the section, following the central section, that results in a caliber reduction has a length greater than 1.5 cm; and
      iv) the distal section that adjoins the port in the base plate has a length of 1 cm; and
   b) the at least one lateral branch has the stylized design of the arterial portion of the human vascular system, and preferably has segmental constrictions and/or expansions.

5. The training device according to claim 1, wherein the contrast agent supply ring is connected to the proximal cylindrical section 1.8 cm below the cover plate.

6. Application of the device according to claim 1 in static angiography, dynamic angiography, 3D angiography, and/or use thereof in registration techniques.

* * * * *